United States Patent [19]

Hofmeister

[11] Patent Number: 4,934,212
[45] Date of Patent: Jun. 19, 1990

[54] HARMONIC DRIVE FLEXSPLINE MANUFACTURE

[75] Inventor: Christopher A. Hofmeister, Derry, N.H.

[73] Assignee: Quincy Technologies, Inc., New Haven, Conn.

[21] Appl. No.: 330,057

[22] Filed: Mar. 29, 1989

[51] Int. Cl.$^5$ ............................................. F16H 33/00
[52] U.S. Cl. ..................................... 74/640; 29/893.34
[58] Field of Search .......................... 74/640; 29/159.2

[56] References Cited

U.S. PATENT DOCUMENTS 3,473,211  10/1969  Lindell ............................. 29/159.2
4,817,457   4/1989  Carlson ................................ 74/640

FOREIGN PATENT DOCUMENTS 0119849   6/1986  Japan ..................................... 74/640

Primary Examiner—Dirk Wright
Attorney, Agent, or Firm—Donald N. Halgren

[57] ABSTRACT

A strain wave gearing device comprising a ring gear having internal axially extending teeth and a strain gear produced from a strain gear blank having constant thickness to the cylindrical and diaphragm portions. The cylindrical portion has external axially extending teeth extending around an annular portion adjacent the open end of the strain gear for engaging with the internal teeth of the ring gear (the number of external teeth on the strain gear being different than the number of internal teeth on the ring gear) and a wave generator is located within and matingly engages with the strain gear. The diaphragm portion is reduced in final thickness from the uniform blank thickness to about one-half the blank thickness by machining, after the strain gear has been produced from the blank. The wave generator adapted to be rotatively driven relative to the strain gear whereby relative rotational movement will occur between the strain and ring gears.

10 Claims, 2 Drawing Sheets

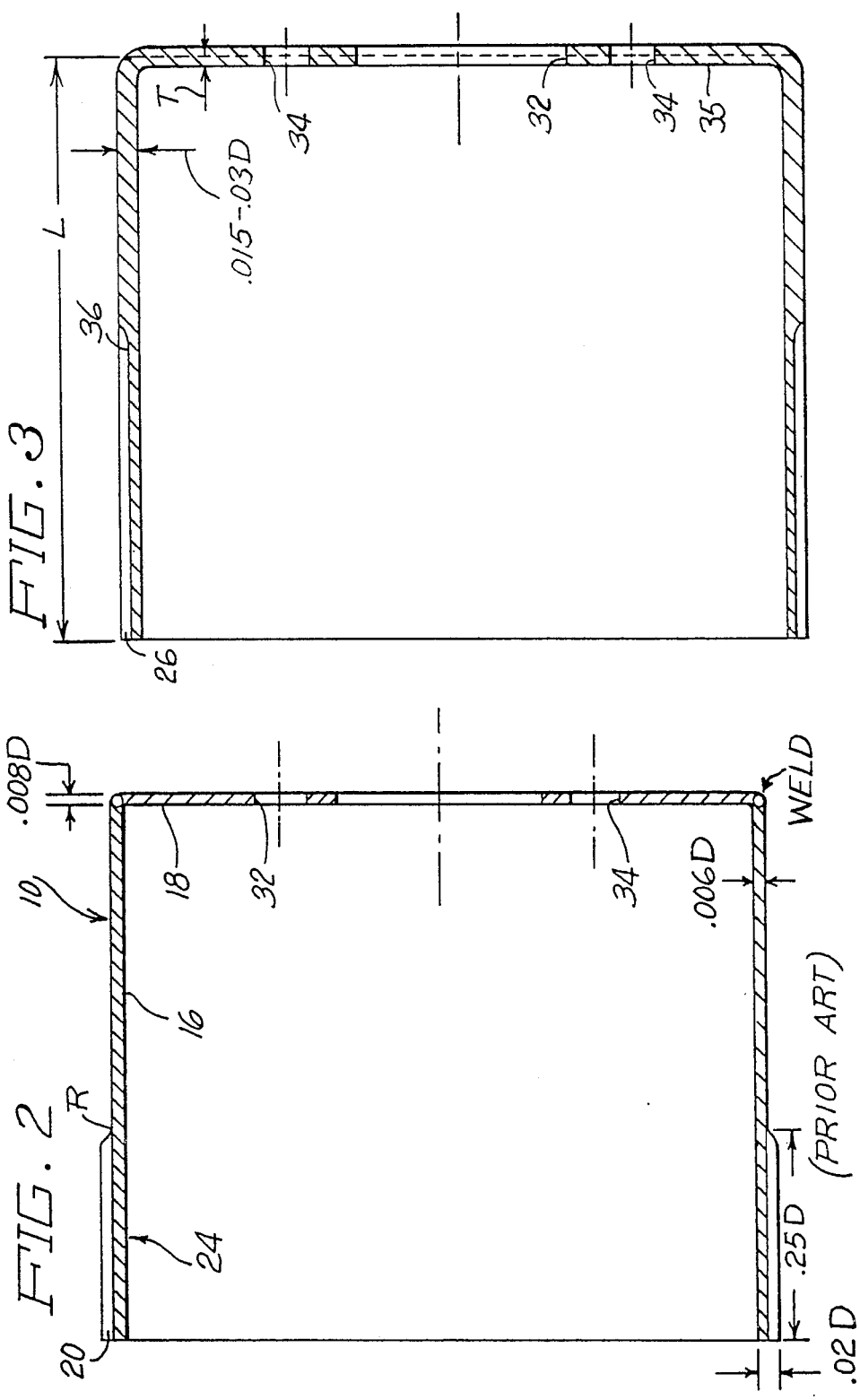

HARMONIC DRIVE FLEXSPLINE MANUFACTURE

BACKGROUND OF THE INVENTION (1) Field of the Invention

This invention relates to motion transmitting mechanisms and more particularly to flexsplines for harmonic drive type transmissions.

(2) Prior Art

This application defines an improvement on copending, commonly assigned U.S application Ser. No. 07/897,695 now U.S. Pat. No. 4,817,457.

Strain wave gearing generally employs three concentric components to produce high mechanical advantage and speed reduction based on the principle of nonrigid body mechanics. An elliptical wave generator is inserted into a cylindrical strain gear distorting the strain gear into an elliptical form. The strain gear is in the form of a flexible tubular member open at one end with external axially extending teeth around the periphery adjacent the opening. These teeth mesh with the internal axially extending teeth on a ring gear or circular spline. The number of teeth in the ring gear usually exceed by two the number of teeth in the strain gear. Since the teeth on the nonrigid strain gear and the teeth in the rigid circular spline are in continuous engagement along the major axis of the elliptical shape, and since the strain gear has two teeth fewer than the circular spline, one revolution of the wave generator, as the input, causes relative motion between the strain gear and the circular spline equal to two teeth. With the circular spline fixed, the strain gear will rotate in the opposite direction to the input at a reduction ratio equal to the number of teeth on the strain gear divided by two. The strain gear may also be the fixed member and the circular spline would be the output member and rotate in the same direction as the input.

Strain wave gearing was first disclosed in U.S. Pat. No. 2,906,143 granted Sept. 29, 1959. In this disclosure, the cylindrical strain gear was depicted as a toothed member typically welded to a thinner walled tubular portion. The importance of the diaphragm portion was either omitted or grossly shown out of proportion. During the development period of strain wave gearing by the assignee of this patent, a strain gear evolved having three different wall thicknesses. There was a cylindrical portion including an annular gear blank portion having a thickness, in a two lobed configuration, almost always slightly in excess of 2%D where D is the pitch diameter of the strain gear and the remaining tubular portion had a thickness of 0.6%D. Welded to the cylindrical portion to close one end was a plate or diaphragm having a thickness of 0.8%D. The cylindrical portion was made from a cylindrical blank. The blank was machined to have a stepped configuration and a large radius blended the tubular and gear blank portions. The gear teeth were then defined in the annular gear blank.

The tubular portion of the strain gear was made thin to minimize the force to deflect the strain gear, but maintained adequate thickness to transmit the output torque and to facilitate manufacturing. The diaphragm was made thin to minimize the deflection stress associated with the inherent scalloping action yet had adequate thickness to transmit the output torque. The product was improved by increasing the diaphragm thickness to 1% to 2% of D. For details of this construction, see U.S. patent application Ser. No. 06/405,454, filed on Aug. 5, 1982 and now abandoned. Although increasing the thickness increased the deflection stress associated with axial deflection or scalloping, it reduced the stress associated with the axial force acting on it resulting in a more favorable stress condition.

The present invention is an improvement in flexspline mechanisms shown in the prior art as well as that shown in copending U.S. application Ser. No. 07/897,695, incorporated herein by reference.

It is an object of the present invention to manufacture a novel strain gear in a new manufacturing process.

BRIEF SUMMARY OF THE INVENTION

The present invention comprises an improved harmonic drive flexspline and a method of making the improved flexspline, wherein a uniformly thick strain gear blank is deep drawn into a cup-shaped cylinder having an open end and a closed end comprising a diaphragm. The diaphragm is machined from its uniform thickness to a reduced thickness of about half of the blank thickness, and gear teeth are machined about the periphery of the open end.

BRIEF DESCRIPTION OF THE DRAWINGS

The objects and advantages of the present invention will become apparent from the following portion of this specification and from the accompanying drawings which illustrate in accordance with the mandate of the patent statutes, a preferred embodiment incorporating the principles of the invention, wherein FIG. 2 is a side view in cross-section of a prior strain gear, and FIG. 3 is a similar view of the strain gear made in accordance with the teachings of the present invention.

DESCRIPTION OF The PREFERRED EMBODIMENT

Figure 1:
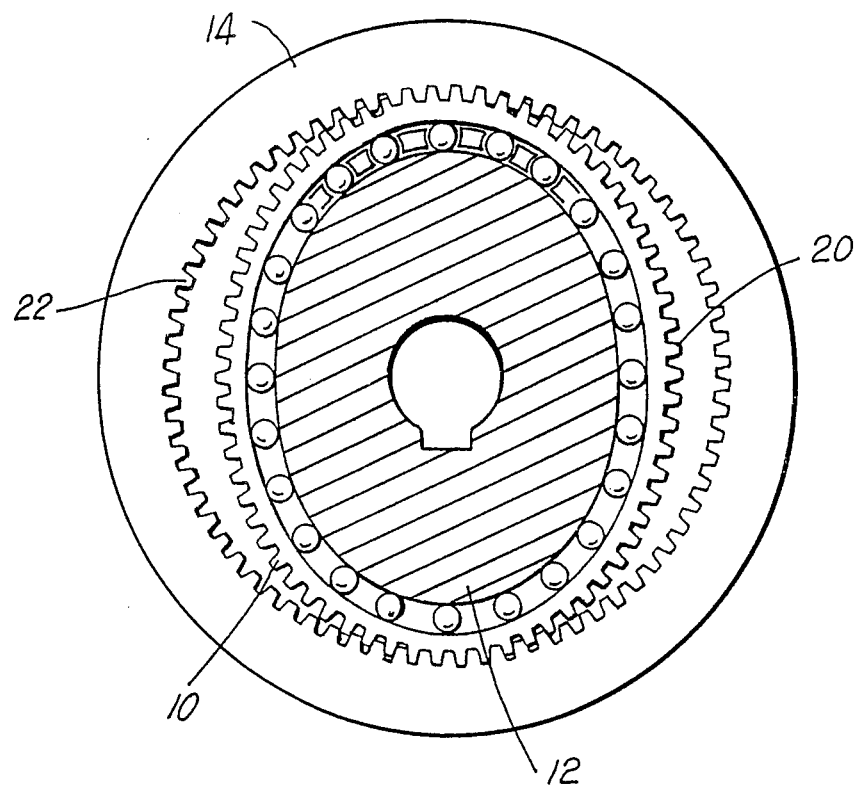
FIG. 1 is a front view of strain wave gearing illustrating its three components.

Strain wave gearing has three main components shown in FIG. 1, namely, a strain gear 10 which conventionally is in the form of a cylinder closed at one end, a wave generator 12 and a ring gear 14. The open end of the strain gear 10 can be deflected into an elliptical configuration by the elliptical wave generator 12. The external gear teeth 20 at the open end of the strain gear 10 engage with internal gear teeth 22 of the ring gear 14 along each side of the major axis of the elliptical shape. Since the number of teeth on the strain gear is different than the number of teeth on the ring gear, rotation of the wave generator will effect relative motion between the strain gear 10 and the ring gear 14.

A prior art strain gear 10, of the aforementioned incorporated patent, is illustrated in FIG. 2. The strain gear can be produced by machining as an integral part; albeit, formally it was produced by welding a cylindrical member 16 to a flat circular plate or diaphragm 18. The diaphragm had a thickness of 0.008D. A pilot diameter 32 and screw holes 34 are provided for attachment purposes. The cylindrical member had a constant bore diameter over the length of the part, however, the outside diameter was stepped to produce two different wall thicknesses. A large radius R provides a gradual transition between the two diameters, although a tapered section in the form of a truncated cone would provide the same function. The greater wall thickness which is in excess of 0.02D, extends axially for approximately 0.25D from one end, and forms the gear blank area 24 into which gear teeth 20 are produced. The remainder of the cylindrical member is the tubular portion 16 and has a wall thickness of 0.006D. The diaphragm 18 is welded to the end of the cylindrical member at the tubular portion.

In accordance with the teachings of the present invention, the original strain gear blank is deep drawn into a cylindrically (cup) shaped flexspline with a closed end 35, as shown in FIG. 3. The newly formed flexspline has an essentially uniform wall thickness of 0.015 to 0.03D. Subsequently, the entire closed end or diaphragm 35 is processed by machining as on a lathe, to a reduced thickness "T" of about one half the thickness of the original blank, as indicated by the dashed line in FIG. 3, that is a thickness of about 0.008 to about 0.015, then the diaphragm 35 is stamped or machined to define a pilot diameter 32 and holes 34 on a bolt circle, to provide an attachment means for the flexspline. The flexspline mays then be trimmed to its intended axial length L and external gear teeth 20 may be defined by forming or machining adjacent the open end of the formed blank. This thinner diaphragm makes it possible to cover the full range of ratios of 50:1 and higher over the aforementioned copending application.

When the gear teeth 26 are generated by a method, such as hobbing, the axial length of the "gear full depth" or "full depth of gear" should be greater than the length of the mating ring gear. However, to improve the flexibility of the strain gear, the gear teeth may be extended a greater distance along the strain gear blank and may be extended the entire length of the strain gear.

When the gear teeth are to be generated by a shaping operation, a 36 relief would be necessary on the strain gear blank O.D. directly behind the teeth 26 to allow the cutter to complete its down stroke in this location. The axial width of this relief should be adequate to allow for cutter run out. An important consideration is to blend the wall thickness in the area of the relief with the wall thickness on either side to produce a gradual change in the neutral axis of the part minimizing the stress concentrating factor.

The gear teeth could also be roll formed which would result in a slight enlargement of the outer diameter of the geared portion. Enlargement of the outer diameter of the gear tooth portion also occurs when the teeth are formed in a die having internal teeth.

The strain gear blanks of uniform wall thickness can be made from any suitable material. However, since most of the materials that are readily formed without intermediate annealing have low mechanical properties it may be desirable to subject the completed strain gear to heat treating or other processes to enhance its mechanical properties.

I claim:

1. A strain wave gearing device comprising a ring gear having internal, axially extending teeth, a cup shaped strain gear made from a strain gear blank having a uniform thickness throughout from about 0.015D to about 0.03D where D is the bore diameter of the cup shaped gear;

externally axially extending teeth means defined around the open end of the cylindrical portion of said strain gear blank for engaging with the internal teeth of said ring gear, the number of external teeth on said strain gear being different from the number of internal teeth on said ring gear; and a closed end portion comprising a diaphragm having a finished thickness of about one half the thickness of said cylindrical portion;

attachment means defined in said diaphragm portion of said strain gear; and a wave generator juxtaposed with respect to said strain gear and adapted to be rotatively driven relative to said strain gear whereby rotational movement will occur between said strain and ring gears.

2. A strain wave gearing device as recited in claim 1, wherein said external axially extending strain gear teeth are machined therein by roll forming.

3. A strain wave gearing device as recited in claim 1, wherein said external axially extending strain teeth are machined therein by hobbing.

4. A strain wave gearing device as recited in claim 1, wherein said external axially extending teeth were machined therein by shaping.

5. A strain wave gearing device as recited in claim 1, wherein said external axially extending strain gear teeth were formed by a die having internal teeth.

6. A strain wave gearing device as recited in claim 1, wherein the finished thickness of said diaphragm portion was reduced by machining, from the uniform thickness of said strain gear blank.

7. A strain wave gearing device as recited in claim 1, wherein said strain gear is of uniform thickness except for said toothed portion and said diaphragm portion which thickness is changed by subsequent machining thereof, from said original blank thickness.

8. A process for making a strain wave flexspline gearing device utilizable for rotatively transmitting torque through a flexible wall thereof, comprising the steps of:

deep drawing a uniformly thick strain gear blank into a cup-shaped cylinder having a closed diaphragm end and an open end, the thickness of the gear blank being 0.015 to 0.03 times the diameter of the bore of the cylinder;

forming gear teeth on the periphery of said open end; and machining the closed diaphragm end thickness from said uniform thickness to a reduced thickness thereof.

9. The process for making a strain wave flexspline gearing device as recited in claim 8, including:

machining the diaphragm thickness to reduce it to about one-half the blank thickness after the deep drawing operation is complete.

10. The process for making a strain wave flexspline gearing device as recited in claim 9, including:

making attachment holes in said reduced thickness diaphragm, to facilitate attachment to said device.

* * * * *